United States Patent
Tanizaki et al.

(10) Patent No.: US 10,832,070 B2
(45) Date of Patent: Nov. 10, 2020

(54) MOBILE TERMINAL, IMAGE PROCESSING METHOD, AND COMPUTER-READABLE RECORDING MEDIUM

(71) Applicant: PFU LIMITED, Ishikawa (JP)

(72) Inventors: Hiroki Tanizaki, Ishikawa (JP); Mitsuru Nishikawa, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 174 days.

(21) Appl. No.: 16/034,912

(22) Filed: Jul. 13, 2018

(65) Prior Publication Data

US 2018/0322355 A1    Nov. 8, 2018

Related U.S. Application Data

(63) Continuation of application No. PCT/JP2016/051564, filed on Jan. 20, 2016.

(51) Int. Cl.
*G06K 9/00* (2006.01)
*G06K 9/20* (2006.01)
(Continued)

(52) U.S. Cl.
CPC ....... *G06K 9/2063* (2013.01); *G06K 9/00442* (2013.01); *G06K 9/036* (2013.01); *G06K 9/6202* (2013.01); *G06K 9/6212* (2013.01); *G06T 7/0002* (2013.01); *H04N 1/00005* (2013.01); *H04N 1/0005* (2013.01); *H04N 1/00037* (2013.01); *H04N 1/00047* (2013.01); *H04N 1/00063* (2013.01); *H04N 1/00087* (2013.01); *H04N 1/00307* (2013.01); *H04N 1/19594* (2013.01); *H04N 1/4074* (2013.01); *H04N 5/2351* (2013.01); *H04N 5/23254* (2013.01); *H04N 5/232941* (2018.08);
(Continued)

(58) Field of Classification Search
None
See application file for complete search history.

(56) References Cited

U.S. PATENT DOCUMENTS

| 2009/0147988 A1* | 6/2009 | Jones ............... G06K 9/036 382/100 |
| 2011/0063456 A1 | 3/2011 | Ohnishi et al. |
| 2014/0327940 A1 | 11/2014 | Amtrup et al. |
| 2014/0363054 A1* | 12/2014 | Noriega Gil ....... G06T 7/40 382/108 |
| 2014/0368890 A1 | 12/2014 | Amtrup et al. |
| 2015/0201109 A1* | 7/2015 | Li ................ H04N 1/4074 348/222.1 |

(Continued)

FOREIGN PATENT DOCUMENTS

| JP | 2004-213331 A | 7/2004 |
| JP | 2005-260597 A | 9/2005 |

(Continued)

OTHER PUBLICATIONS

Search Report issued in corresponding International Patent Application No. PCT/JP2016/051564, dated Apr. 12, 2016.

*Primary Examiner* — Sean M Conner
(74) *Attorney, Agent, or Firm* — McDermott Will & Emery LLP

(57) ABSTRACT

A mobile terminal includes a memory, and a processor coupled to the memory, wherein the processor executes a process comprising acquiring a frame with taking a photograph, acquiring document image data of a document from the frame, detecting shine on the document image data, determining whether the shine is equal to or smaller than a shine baseline, and acquiring a frame with retaking a photograph when the shine is neither equal to nor smaller than the shine baseline.

14 Claims, 9 Drawing Sheets

(51) Int. Cl.
- *G06K 9/03* (2006.01)
- *H04N 1/00* (2006.01)
- *H04N 5/235* (2006.01)
- *H04N 5/232* (2006.01)
- *H04N 1/407* (2006.01)
- *H04N 1/195* (2006.01)
- *G06K 9/62* (2006.01)
- *G06T 7/00* (2017.01)
- *H04N 101/00* (2006.01)

(52) U.S. Cl.
CPC ............ *G06T 2207/10004* (2013.01); *G06T 2207/10024* (2013.01); *G06T 2207/30168* (2013.01); *G06T 2207/30176* (2013.01); *H04N 2101/00* (2013.01); *H04N 2201/0084* (2013.01); *H04N 2201/0096* (2013.01)

(56) References Cited

U.S. PATENT DOCUMENTS

| | | | |
|---|---|---|---|
| 2015/0256713 A1* | 9/2015 | Booth | G06K 9/38 358/466 |
| 2016/0063305 A1* | 3/2016 | Matsunaga | G06K 9/00228 382/167 |

FOREIGN PATENT DOCUMENTS

| | | | |
|---|---|---|---|
| JP | 2005260597 A | * | 9/2005 |
| JP | 2008-040910 A | | 2/2008 |
| JP | 2008-310624 A | | 12/2008 |
| JP | 2008-310772 A | | 12/2008 |
| JP | 2008310624 A | * | 12/2008 |
| JP | 2011-066690 A | | 3/2011 |
| JP | 2014-123881 A | | 7/2014 |

\* cited by examiner

MOBILE TERMINAL, IMAGE PROCESSING METHOD, AND COMPUTER-READABLE RECORDING MEDIUM

CROSS-REFERENCE TO RELATED APPLICATION

This application is a continuation of International Application No. PCT/JP2016/051564, filed on Jan. 20, 2016, the entire contents of which are incorporated herein by reference.

FIELD

The disclosure discussed herein is related to a mobile terminal, an image processing method, and a computer-readable recording medium.

BACKGROUND

Conventional techniques that determine acceptability of image quality are disclosed.

A technique for digital cameras is particularly disclosed that determines legibility of a character extracted from a photographed image and notifies the photographer of the acceptability of the image quality Examples of related-art are described in JP-A-2005-260597.

However, conventional digital cameras do not determine acceptability of image quality in such a manner that detects shine on the image data from, for example, an area on the image data where halation occurs. This may problematically result in inaccurate determination of the image quality of the photographed subject.

SUMMARY

According to an aspect of an embodiment, a mobile terminal includes a memory, and a processor coupled to the memory, wherein the processor executes a process comprising acquiring a frame with taking a photograph, acquiring document image data of a document from the frame, detecting shine on the document image data, determining whether the shine is equal to or smaller than a shine baseline, and acquiring a frame with retaking a photograph when the shine is neither equal to nor smaller than the shine baseline.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the disclosure will be explained with reference to accompanying drawings. It should be noted that the embodiment is not intended to limit the disclosure.

Structure of Embodiment

Figure 1:
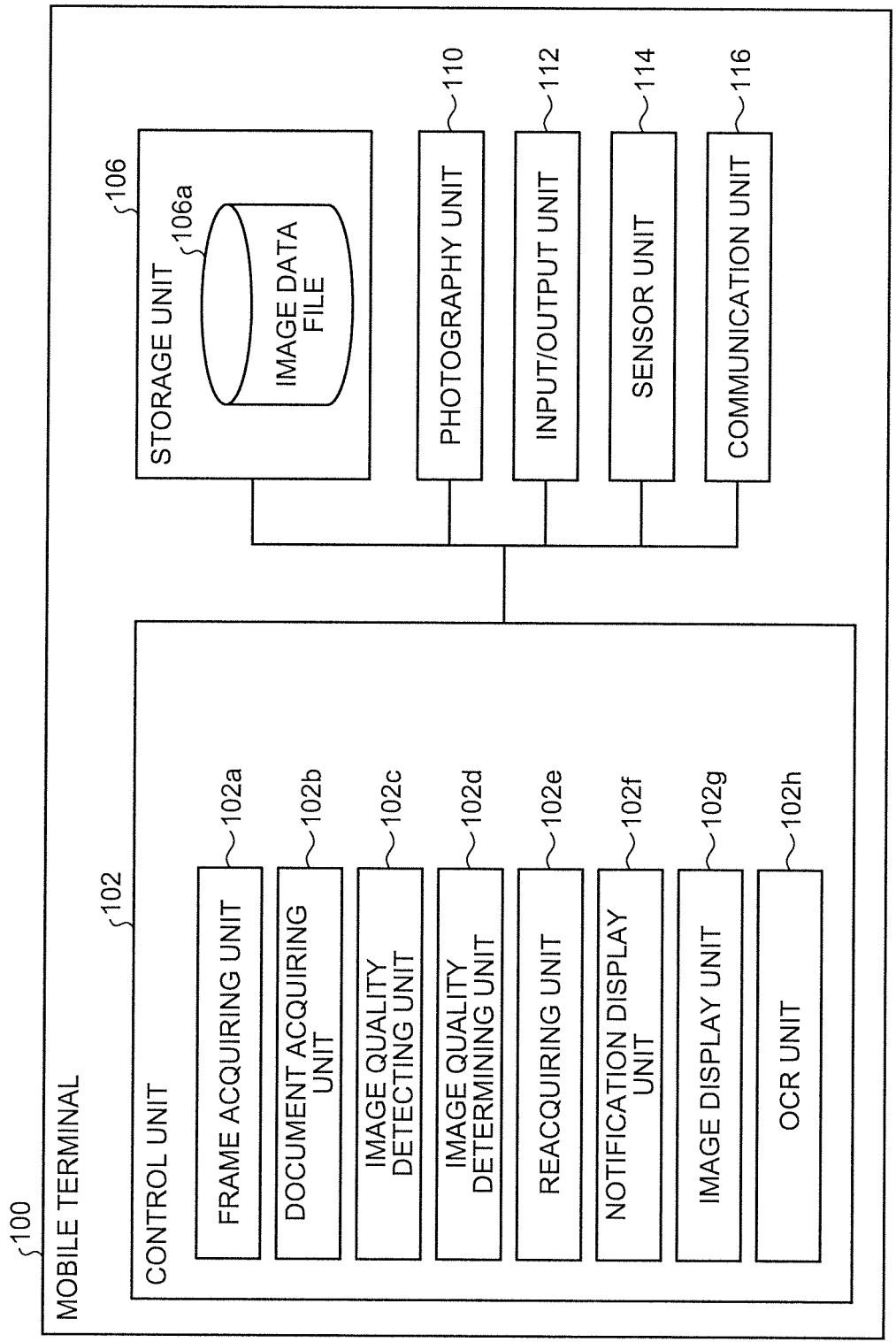
FIG. 1 is block diagram of an exemplary construction of a mobile terminal according to an embodiment.

An exemplary construction of a mobile terminal 100 according to an embodiment of the disclosure will first be described with reference to FIG. 1, and processing and others of the embodiment will be thereafter described in detail. FIG. 1 is block diagram of an exemplary construction of the mobile terminal 100 according to the embodiment.

The embodiment described below is an illustrative example of the mobile terminal 100 to embody technical thoughts of the disclosure, and the embodiment is not intended to limit the disclosure to this mobile terminal 100. The embodiment is equally applicable to the mobile terminal 100 according to other embodiments included in the appended claims.

Furthermore, forms for functional separation of the exemplary mobile terminal 100 according to the embodiment is not limited to the below description, and the mobile terminal 100 can be functionally or physically separated and integrated in any unit within the range in which like effects and like functions can be exerted.

Examples of the mobile terminal 100 may include a portable mobile information processing device such as a tablet terminal, a mobile phone, a smartphone, a personal handy-phone system (PHS), a personal digital assistant (PDA), and a notebook personal computer.

As shown in FIG. 1, the mobile terminal 100 schematically includes a control unit 102, a storage unit 106, a photography unit 110, an input/output unit 112, a sensor unit 114, and a communication unit 116.

Although being omitted in FIG. 1, according to this embodiment, an input/output interface unit (not shown) that connects the input/output unit 112 and the control unit 102 with each other may further be included. These units of the mobile terminal 100 are communicably connected with one another through any communication path.

The communication unit 116 may be a network interface (such as a network interface controller (NIC)) for receiving and transmitting IP data through any one or both of wired communication and wireless communication (such as WiFi), Bluetooth (registered trademark), or an interface that establishes wireless communication using infrared communication and the like.

The mobile terminal 100 may be communicably connected with an external device using the communication unit 116 via a network.

The sensor unit 114 detects the physical quantity and converts the detected quantity into a signal (a digital signal) of another medium. The sensor unit 114 may include, for example, any one, some, or all of a proximity sensor, a direction sensor, a magnetic field sensor, a linear acceleration sensor, a brightness sensor, a gyro sensor, a pressure sensor, a gravity sensor, an acceleration sensor, a pneumatic sensor, and a temperature sensor.

The input/output unit 112 inputs and outputs (I/O) data. The input/output unit 112 may be, for example, any one, some, or all of a key input unit, a touch panel, a control pad (such as a touch pad and a game pad), a mouse, a keyboard, and a microphone.

The input/output unit 112 may be a display unit (for example, a display, a monitor, and a touch panel using liquid crystal, organic electro-luminescence (EL), or the like) that displays a display screen of an application and the like.

The input/output unit 112 may be a voice output unit (for example, a speaker) that outputs voice information in voice. The input/output unit (a touch panel) 112 may further include the sensor unit 114 that detects a physical contact and converts the contact into a signal (a digital signal).

The photography unit 110 acquires image data (frames) of sequential images (a moving image) by sequentially photographing (photography of a moving image) an image of a subject (for example, a document). For example, the photography unit 110 may acquire video image data. The photography unit 110 may acquire ancillary data.

The photography unit 110 may be a camera having an image capturing element including, for example, any one or both of a charge coupled device (CCD) and a complementary metal oxide semiconductor (CMOS).

The photography unit 110 may acquire image data of a still image by photographing the still image of a subject. A frame may be uncompressed image data or may be image data with high resolution.

High resolution may include full high-definition, 4K resolution, a super high-definition (8K resolution), or the like. The photography unit 110 may photograph a moving image at 24 fps, 30 fps, or the like.

The storage unit 106 is a storage unit that is able to use, for example, any one, some, or all of a memory such as a random access memory (RAM) and a read only memory (ROM), a stationary disk device such as a hard disk drive, a solid state drive (SSD), and an optical disc.

The storage unit 106 stores any one, some, or all of various kinds of databases, tables, buffers, and files (such as an image data file 106a). The storage unit 106 may store, for example, a computer program that commands a central processing unit (CPU) and executes various kinds of processing.

The storage unit 106 may further store a character size readable by an optical character recognition (OCR) engine and the like.

Of the components of the storage unit 106, the image data file 106a stores image data (frames and others). The image data file 106a may further store document image data.

The image data file 106a may further store area image data of a selected area in the document. The image data file 106a may further store area image data of a divided area in the document.

The image data file 106a may store area image data of a content area in the document. The image data file 106a may store positional data of a document, a divided area, a content area, or the like.

The image data file 106a may store character data corresponding to image data. The image data file 106a may store video data. The image data file 106a may store ancillary data.

The control unit 102 includes, for example, a CPU for integrally controlling the mobile terminal 100. The control unit 102 has an interior memory for storing a control program, a computer program that defines various kinds of processing procedures and the like, and necessary data and performs information processing for executing various kinds of processing based on these programs.

The control unit 102 functionally and conceptually includes a frame acquiring unit 102a, a document acquiring unit 102b, an image quality detecting unit 102c, an image quality determining unit 102d, a reacquiring unit 102e, a notification display unit 102f, an image display unit 102g, and an OCR unit 102h.

The frame acquiring unit 102a acquires image data (a frame). The frame acquiring unit 102a may acquire image data obtained with the photography unit 110 taking a photograph. The frame acquiring unit 102a may acquire uncompressed high-resolution image data.

The frame acquiring unit 102a may acquire image data corresponding to a frame by controlling photography of sequential images or a moving image by the photography unit 110. The frame acquiring unit 102a may acquire image data by controlling photography of a still image by the photography unit 110. The frame acquiring unit 102a may further acquire ancillary data.

The document acquiring unit 102b acquires document image data of a document. The document acquiring unit 102b may acquire document image data of the document from a frame. The document acquiring unit 102b may acquire area image data of a selected area in the document from a frame.

The document acquiring unit 102b may acquire area image data of a selected area in the document from a frame based on the type of the document. The area may be a content area in the document defined depending on the type of the document.

The document acquiring unit 102b may acquire area image data of a divided area in the document from a frame. The document acquiring unit 102b may acquire area image data of a content area in the document from a frame based on the type of the document and the position from an end of the document. The content area may be a character area.

The document acquiring unit 102b may detect positional data of the document from a frame. The document acquiring unit 102b may detect corner coordinates of the document from the frame. The document acquiring unit 102b may detect a layout of the document from the frame.

The document acquiring unit 102b may detect positional data of the document from a frame using any one or both of a method for edge detection and a method for feature-point matching and acquire document image data based on the positional data of the document. The document may be a rectangular document.

The document acquiring unit 102b may specify the type of the document. The document acquiring unit 102b may specify the type of the document using any one or both of a method for layout recognition and a method for size detection.

The image quality detecting unit 102c detects image quality of document image data of a document. The image quality detecting unit 102c may detect shine on the document image data. The image quality detecting unit 102c may further detect shine on area image data.

The image quality detecting unit 102c may calculate a threshold of shine based on a background gradation value as a gradation value with highest frequency of gradation values of pixels included in the document image data and based on a gradation value with high frequency of gradation values larger than the background gradation value and detect the total number of pixels with gradation values larger than the threshold among the pixels included in the document image data as shine.

The image quality detecting unit 102c may detect shine on area image data of each divided area. The image quality detecting unit 102c may further detect blur on document image data. Blur may correspond to edge strength or the like.

The image quality determining unit 102d determines image quality of image data. The image quality determining unit 102d may determine whether shine is equal to or smaller than a shine baseline.

The image quality determining unit 102d may determine whether shine detected by the image quality detecting unit 102c is equal to or smaller than the shine baseline on all of the divided areas. Furthermore, the image quality determining unit 102d may determine whether blur is equal to or larger than the blur baseline.

The reacquiring unit 102e acquires image data obtained with the photography unit 110 retaking a photograph. When the image quality determining unit 102d determines shine to be neither equal to nor smaller than the shine baseline, the reacquiring unit 102e may acquire a frame obtained with the photography unit 110 retaking a photograph.

Likewise, when the image quality determining unit 102d determines blur to be neither equal to nor larger than the blur baseline, the reacquiring unit 102e may acquire a frame obtained with the photography unit 110 retaking a photograph.

The reacquiring unit 102e may acquire a new frame by controlling photography (photography of sequential images, a moving image, a still image, or the like) by the photography unit 110. The reacquiring unit 102e may further store the acquired frame in the image data file 106a.

The notification display unit 102f displays notification data. When the image quality determining unit 102d determines shine to be neither equal to nor smaller than the shine baseline, the notification display unit 102f may display notification data indicative of what the user needs to do. The notification display unit 102f may have the notification data displayed on the input/output unit 112.

The image display unit 102g displays image data. The image display unit 102g may display any one or both of a frame and document image data. The image display unit 102g may have the image data displayed on the input/output unit 112.

The OCR unit 102h performs OCR processing on image data and acquires character data. The OCR unit 102h may perform OCR processing on document image data or a frame and acquire character data. The OCR unit 102h may further store the acquired character data in the image data file 106a.

Processing According to Embodiment

Exemplary processing performed by the mobile terminal 100 in this construction will now be described with reference to FIG. 2 to FIG. 13.

Automatic Photographing Processing (1)

Figure 2:
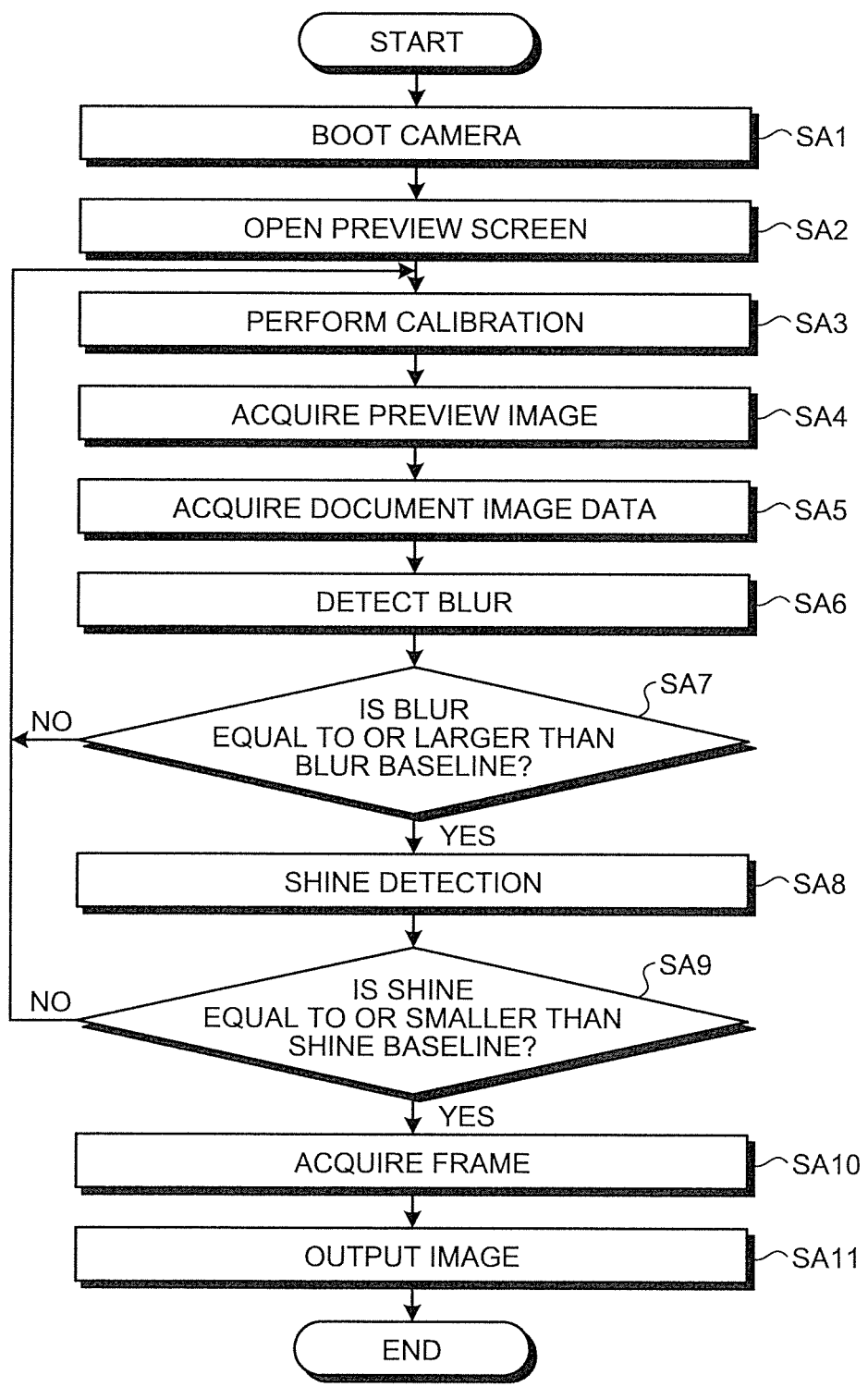
FIG. 2 is a flowchart of exemplary processing of the mobile terminal according to the embodiment.

Exemplary automatic photographing processing according to the embodiment will now be described with reference to FIG. 2 to FIG. 6. FIG. 2 is a flowchart of exemplary processing of the mobile terminal 100 according to the embodiment.

As shown in FIG. 2, the control unit 102 boots the photography unit 110 (Step SA1). A camera is an example of the photography unit 110.

The image display unit 102g displays image data of a preview screen (a preview image) photographed by the photography unit 110 on the input/output unit 112 (Step SA2).

The control unit 102 calibrates the input/output unit 112 (Step SA3). The control unit 102 may further calibrate the photography unit 110.

The frame acquiring unit 102a acquires an uncompressed high-resolution frame of the preview image photographed by the photography unit 110 (Step SA4).

The document acquiring unit 102b detects positional data of a rectangular document from the frame using any one or both of a method for edge detection and a method for feature-point matching and acquires document image data based on the positional data of the rectangular document (Step SA5).

According to the embodiment, a rectangular document (the whole of the document) included in the image can be detected.

The image quality detecting unit 102c detects blur (edge strength) of the document image data (Step SA6). According to the embodiment, blur can be detected from content and the like in the document.

The image quality determining unit 102d determines whether blur on the document image data is equal to or larger than a blur baseline (Step SA7).

If the image quality determining unit 102d determines that the blur on the document image data is neither equal to nor larger than the blur baseline (No at Step SA7), the processing is shifted to Step SA3.

If the image quality determining unit 102d determines that the blur on the document image data is equal to or larger than the blur baseline (Yes at Step SA7), the processing is shifted to Step SA8.

Figure 3:
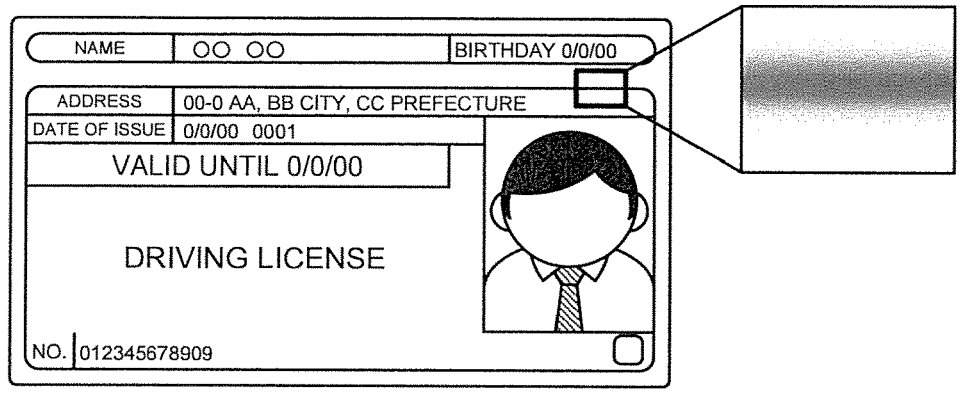
FIG. 3 is a drawing of exemplary blur detection according to the embodiment.
Figure 4:
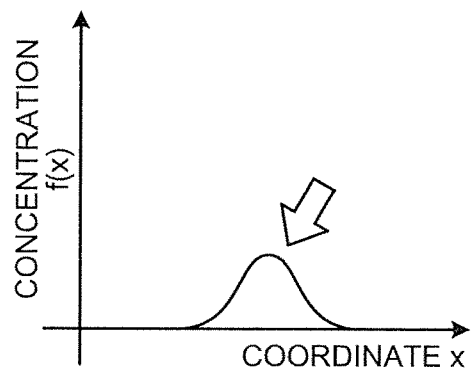
FIG. 4 is a drawing of exemplary blur detection according to the embodiment.

Exemplary blur detection according to the embodiment will now be described with reference to FIG. 3 and FIG. 4. FIG. 3 and FIG. 4 are drawings of exemplary blur detection according to the embodiment.

As shown in FIG. 3, a method for detecting blur on image data extracts one or a plurality of areas from the document area and calculates edge strength of a feature (for example, a ruled line on a form) of the extracted area using the differential operation.

The differential operation may be operation calculating a difference in the color value between a target pixel and a vertically or horizontally adjacent pixel.

For example, the differential operation may use formulas such as: $\Delta_x f = f[i+1,j] - f[i-1,j]$, $\Delta_y f = f[i,j+1] - f[i,j-1]$ (x: abscissa axis, y: ordinate axis, i: an x coordinate, j: a y coordinate, f[i,j]: a color value corresponding to the coordinates (i,j)).

$\Delta_x f$ defines a differential value on the coordinates (i,j) in the x direction, whereas $\Delta_y f$ defines a differential value on the coordinates (i,j) in the y direction.

As shown in FIG. 4, the method for blur detection determines whether the edge strength is equal to or larger than a blur baseline (whether the edge strength exceeds certain concentration f(x)). If the edge strength is equal to or larger than the blur baseline, which means that a ruled line or the like has a clear contrast, the method determines that the image data has no blur.

Referring back to FIG. 2, the image quality detecting unit 102c calculates a threshold of shine based on a background gradation value as a gradation value with highest frequency of gradation values of pixels included in the document image data and based on a gradation value with high frequency of gradation values larger than the background gradation value and detects the total number of pixels with gradation values larger than the threshold among the pixels included in the document image data as shine (Step SA8).

According to the embodiment, shine can be detected from a halation area on the document.

The image quality determining unit 102d further determines whether shine is equal to or smaller than a shine baseline (Step SA9).

If the image quality determining unit 102d determines that the shine is neither equal to nor smaller than the shine baseline (No at Step SA9), the processing is shifted to Step SA3.

According to the embodiment, a retrying function that repeats image acquisition unless any one or both of blur and shine satisfy the respective baselines may be included.

If the image quality determining unit 102d determines that the shine is equal to or smaller than the shine baseline (Yes at Step SA9), the processing is shifted to Step SA10.

Figure 5:
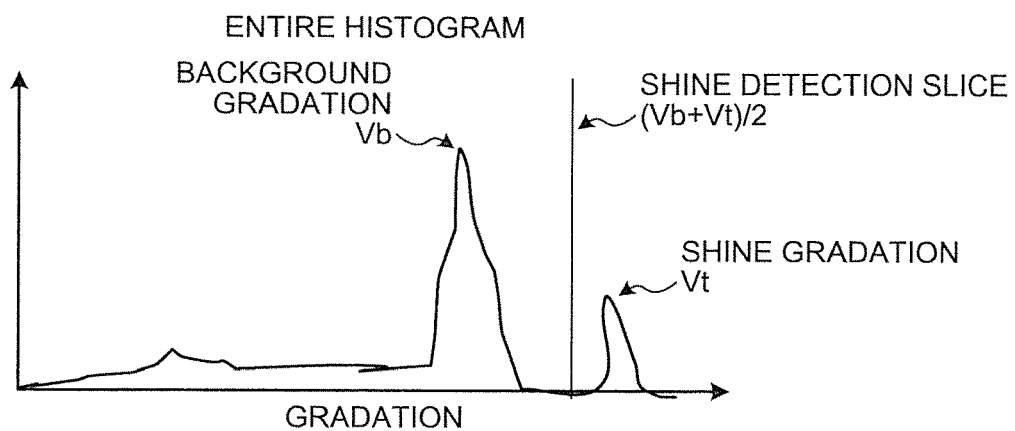
FIG. 5 is a drawing of exemplary shine detection according to the embodiment.

Exemplary shine detection according to the embodiment will now be described with reference to FIG. 5. FIG. 5 is a drawing of exemplary shine detection according to the embodiment.

In this embodiment, a method for detecting shine on image data calculates a shine detection slice and calculates shine on a per-area basis.

For example, as shown in FIG. 5, a method for calculating shine detection slice creates a histogram from document image data of a document area and acquires a gradation having the highest frequency as a background gradation Vb. If a peak occurs on a gradation larger than the background gradation Vb, the method may acquire the gradation of the top of the peak as a shine gradation Vt.

As shown in FIG. 5, the method for calculating a shine detection slice may calculate the shine detection slice by: (Vb+Vt)/2. According to the embodiment, if there are no shine gradations Vt, the method may determine the image data to have no shine.

As shown in FIG. 5, if a pixel in the document image data is equal to or larger than the shine detection slice, (Vb+Vt)/2, the method for calculating shine may determine the pixel to be a shine pixel and calculate the total number of shine pixels as shine.

If the shine is larger than a shine baseline, the method may determine this document area to be shine. According to the embodiment, a simpler method for calculating shine may determine an area having a shine gradation Vt equal to 255 to be shine.

Referring back to FIG. 2, the reacquiring unit 102e acquires a frame used for image quality determination by the image quality determining unit 102d or acquires a high-resolution uncompressed new frame by controlling photography by the photography unit 110, and stores the frame in the image data file 106a (Step SA10).

According to the embodiment, an automatic shutter function that performs automatic photography when blur and shine satisfy respective baselines may be included.

The image display unit 102g outputs (displays) the frame (image data) used for image quality determination, the new frame (image data) acquired by the reacquiring unit 102e, or document image data included in the frame, to the input/output unit 112 (Step SA11), and the processing is ended.

The OCR unit 102h may further perform OCR processing on the document image data or the frame displayed on the input/output unit 112, acquire character data, and store the character data in the image data file 106a.

Figure 6:
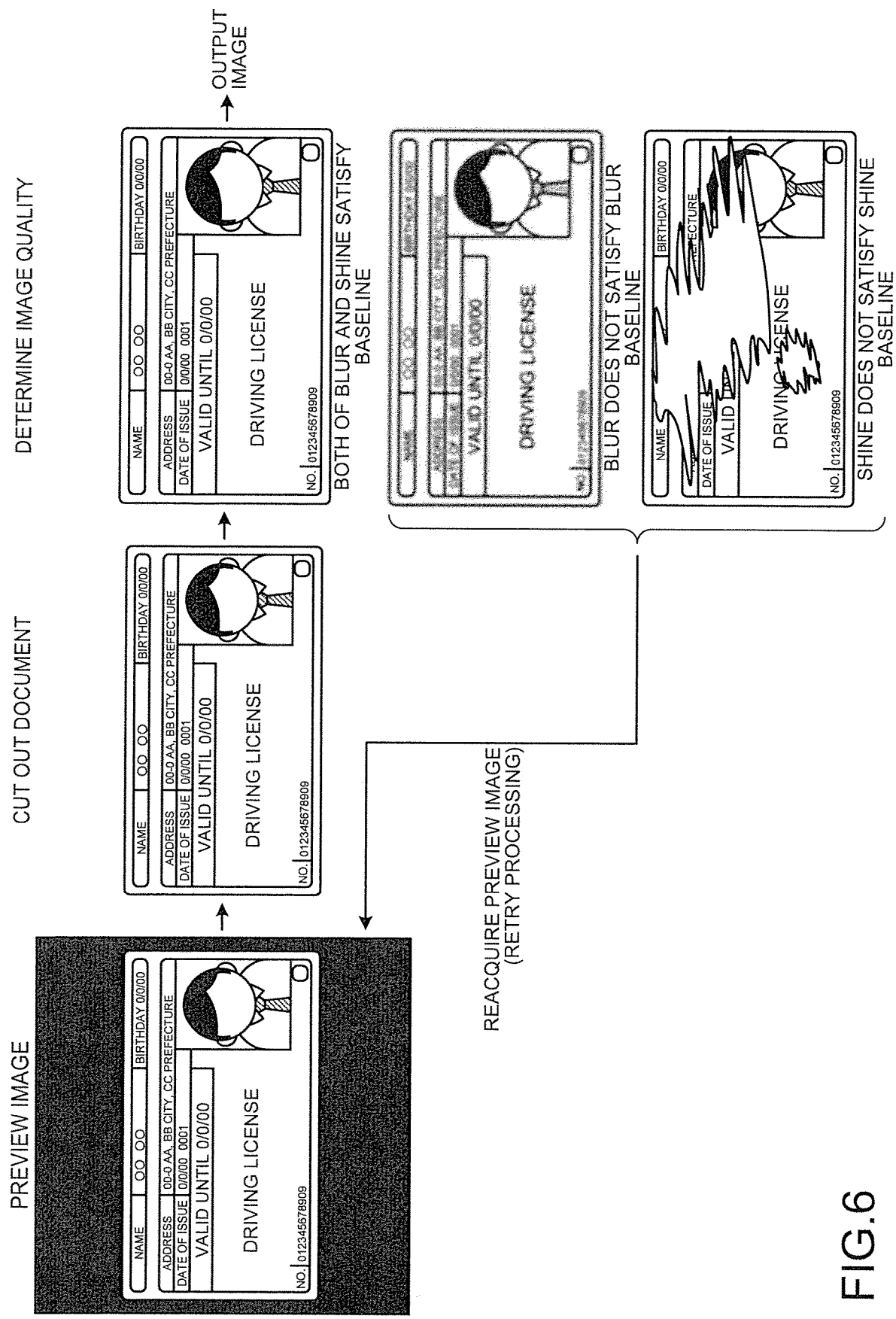
FIG. 6 is a drawing of exemplary automatic photographing processing according to the embodiment.

Exemplary automatic photographing processing according to the embodiment will now be described with reference to FIG. 6. FIG. 6 is a drawing of exemplary automatic photographing processing according to the embodiment.

As shown in FIG. 6, according to the embodiment, such a process may be applicable that reads a moving image of a license (a driving license), cuts out document image data of the document from each frame of the preview image, determines image quality of a content part in the document, and outputs the image if the image quality (blur and shine) satisfies a baseline.

As shown in FIG. 6, according to the embodiment, unless the image quality (blur and shine) satisfies the baseline, frames of the preview image may be reacquired, and the same processing may be repeated (retry processing).

According to the embodiment, in preview photography by a camera, a method of determining acceptability of image quality of a document area on real time detects a target document area from the preview image and detects blur of content (such as a character, a ruled line, and a figure) and shine in a halation area from the document.

According to the embodiment, unless the image quality satisfies the baseline, the image quality may be determined to be inappropriate for photography. Photography and determination processes may be therefore repeated.

According to the embodiment, if the image quality satisfies the baseline, a determination image or an image photographed at the next timing may be automatically output.

Automatic Photographing Processing (2)

Figure 7:
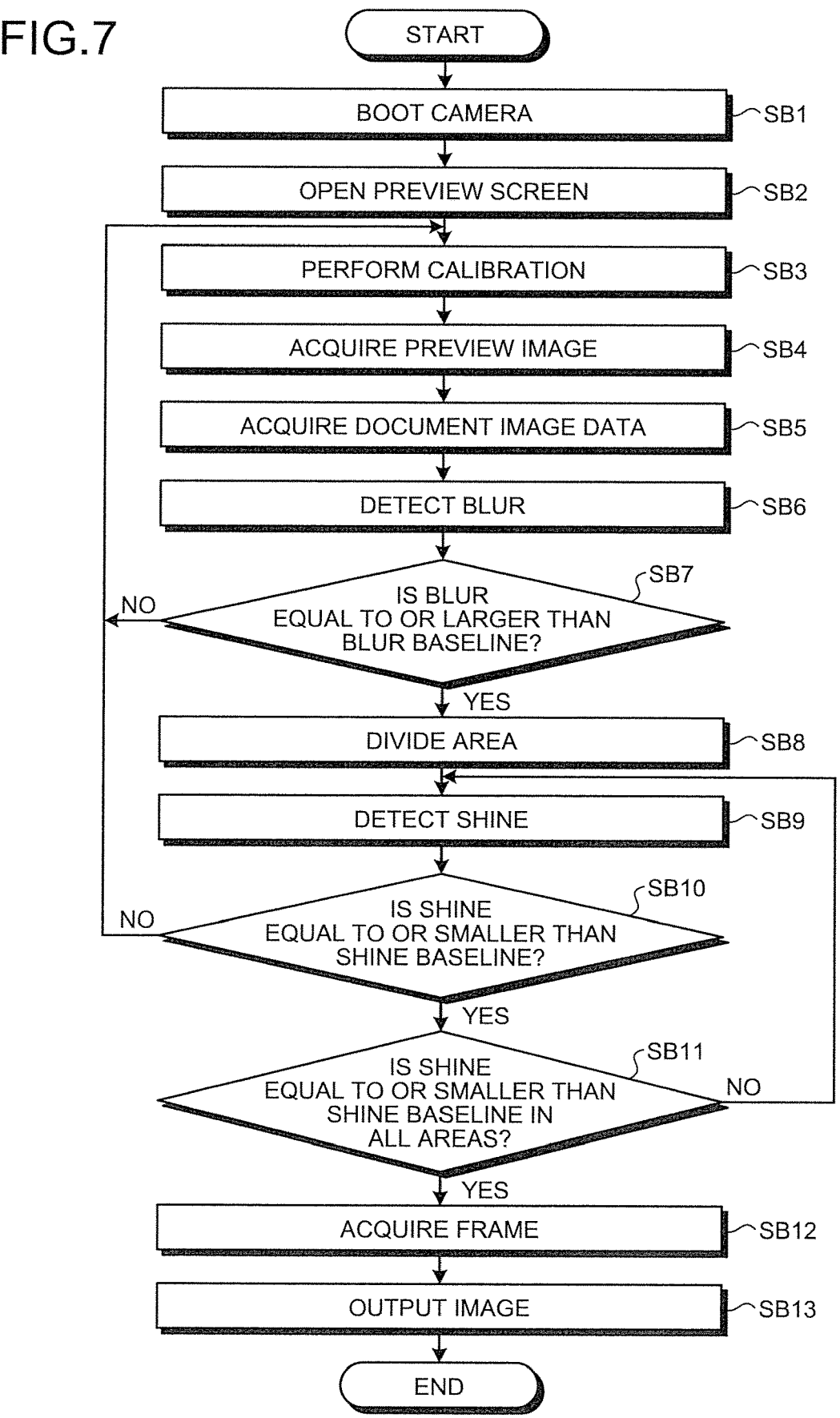
FIG. 7 is a flowchart of exemplary processing of the mobile terminal according to the embodiment.

Exemplary automatic photographing processing according to the embodiment will now be described with reference to FIG. 7 and FIG. 8. FIG. 7 is a flowchart of exemplary processing of the mobile terminal 100 according to the embodiment.

The processing from SB1 to SB7 shown in FIG. 7 is the same as the processing from SA1 to SA7 shown in FIG. 2, and explanation thereof will be thus omitted.

The document acquiring unit 102b specifies the document type of a rectangular document using any one or both of a method for layout recognition and a method for size detection, divides a content area (a character area) in the document based on the document type of the rectangular document and the position from an end of the document, and acquires area image data of the content area in the rectangular document from a frame (Step SB8).

Exemplary content area detection according to the embodiment will now be described with reference to FIG. 8. FIG. 8 is a drawing of exemplary content area detection according to the embodiment.

Figure 8:
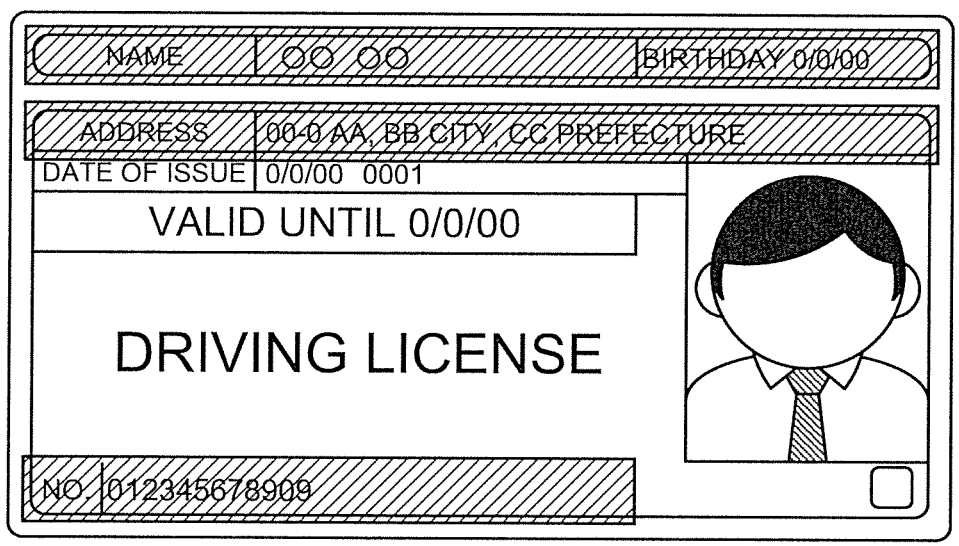
FIG. 8 is a drawing of exemplary detection of a content area according to the embodiment.

As shown in FIG. 8, with regard to the position of a content area, positions of a ruled line and a character are obvious in a regular form such as a driving license, and area image data in the positions may therefore be acquired. Examples of a regular form may include various kinds of licenses including a driving license, various kinds of identification cards, and a health insurance card.

With regard to determination of a position on a document, a document end is specified by a conventional method that detects four sides of the document. A content area may therefore be detected based on a position from the document end. According to the embodiment, this manner allows a selected area in the document to be detected from an image.

Referring back to FIG. 7, the image quality detecting unit 102c detects shine on an area image data piece (Step SB9).

The image quality determining unit 102d further determines whether the shine is equal to or smaller than a shine baseline (Step SB10).

If the image quality determining unit 102d determines that the shine is neither equal to nor smaller than the shine baseline (No at Step SB10), the processing is shifted to Step SB3.

If the image quality determining unit 102d determines that the shine is equal to or smaller than the shine baseline (Yes at Step SB10), the processing is shifted to Step SB11.

The image quality determining unit 102d determines whether shine on the area image data has been determined to be equal to or smaller than the shine baseline on all the areas (Step SB11).

If the image quality determining unit 102d determines that shine on the area image data is not yet determined to be equal to or smaller than the shine baseline on all the areas (No at Step SB11), the processing is shifted to Step SB9.

If the image quality determining unit 102d determines that shine on the area image data has been determined to be equal to or smaller than the shine baseline on all the areas (Yes at Step SB11), the processing is shifted to Step SB12.

The processing from SB12 to SB13 shown in FIG. 7 is the same as the processing from SA10 to SA11 shown in FIG. 2, and explanation thereof will be thus omitted.

According to the embodiment, with regard to an area having no characters (an unnecessary area for the user), the image may be directly output even if the image quality does not satisfy the baseline. The image quality of the area is not necessarily determined.

According to the embodiment, only a necessary area of areas having characters may selectively be a target of image quality determination. According to the embodiment, as with a driving license as shown in FIG. 8, for example, image quality may be selectively determined on positions of the name, the birthday, the address, and the number.

According to the embodiment, image quality is selectively determined on a necessary content area to determine image quality of the document area. This structure can achieve high-speed processing, which facilitates photography.

Automatic Photographing Processing (3)

Figure 9:
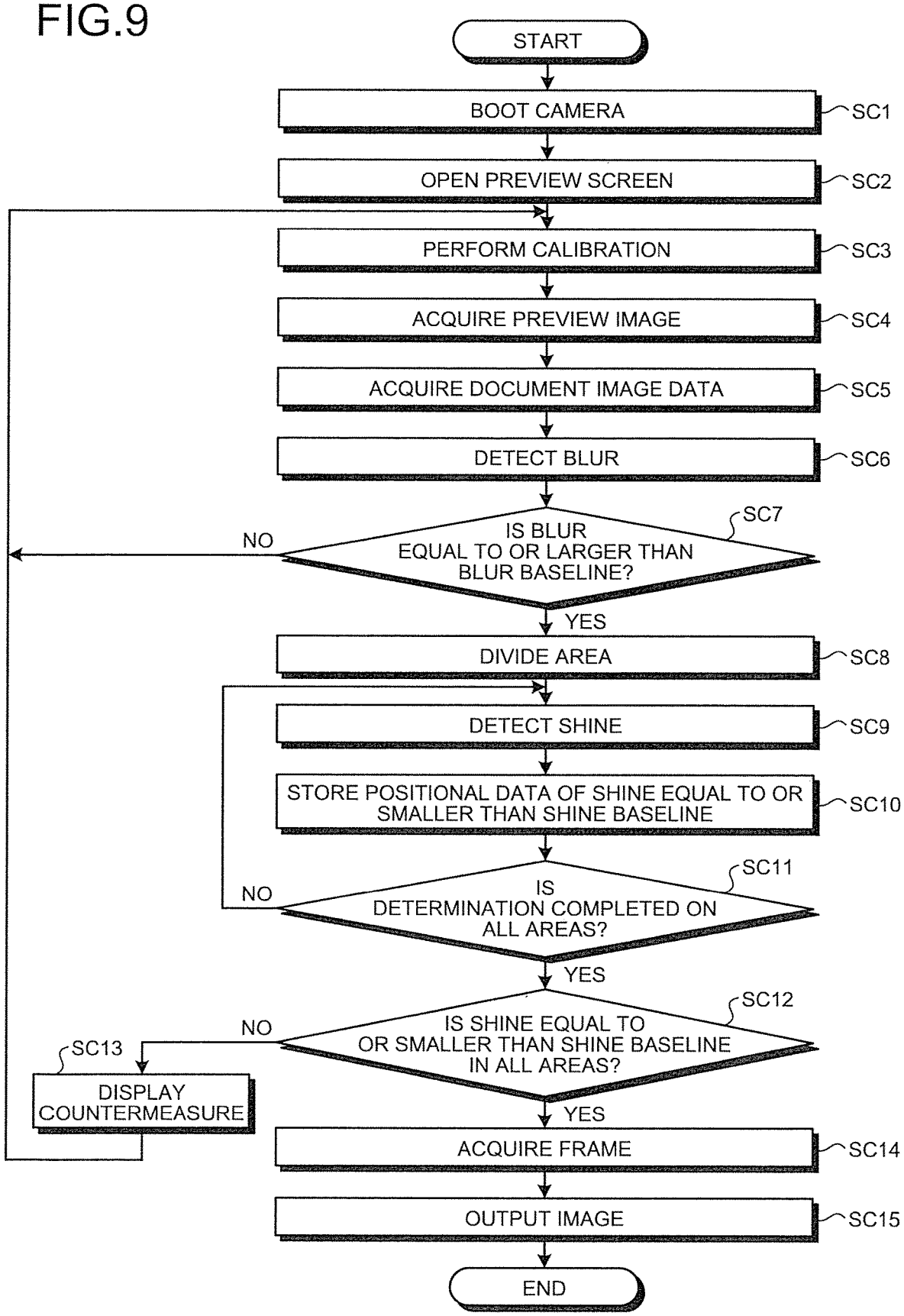
FIG. 9 is a flowchart of exemplary processing of the mobile terminal according to the embodiment.

Exemplary automatic photographing processing according to the embodiment will now be described with reference to FIG. 9 to FIG. 13. FIG. 9 is a flowchart of exemplary processing of the mobile terminal 100 according to the embodiment.

The processing from SC1 to SC7 shown in FIG. 9 is the same as the processing from SA1 to SA7 shown in FIG. 2, and explanation thereof will be thus omitted.

The document acquiring unit 102b divides the document image data into a plurality of areas and acquires area image data of a divided area in the rectangular document from a frame (Step SC8).

Figure 10:
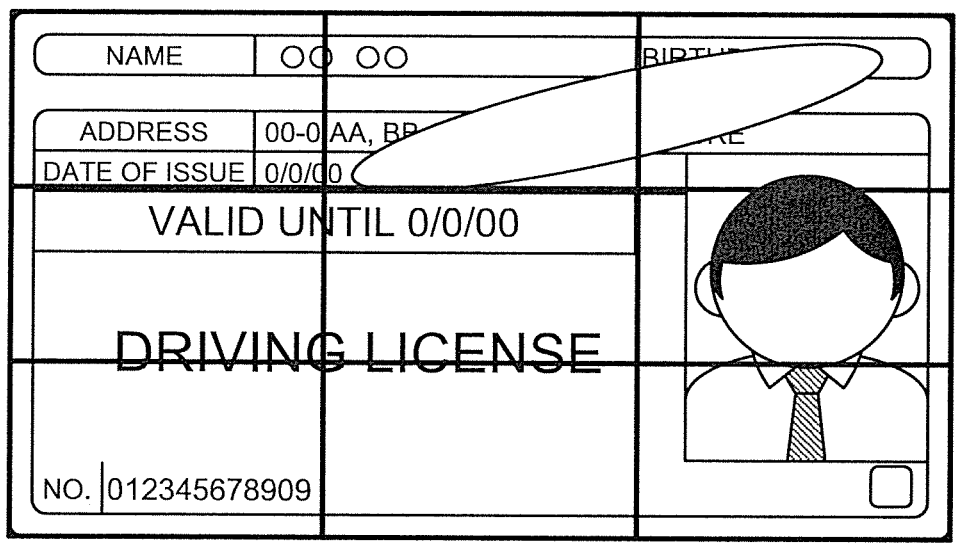
FIG. 10 is a drawing of exemplary area division according to the embodiment.

Exemplary area division according to the embodiment will now be described with reference to FIG. 10. FIG. 10 is a drawing of exemplary area division according to the embodiment.

As shown in FIG. 10, according to the embodiment, a document (a document area) may be equally divided into 3×3 areas, and area image data of a divided area in the document may be acquired.

Referring back to FIG. 9, the image quality detecting unit 102c detects shine on area image data of a divided area (Step SC9).

Figure 11:
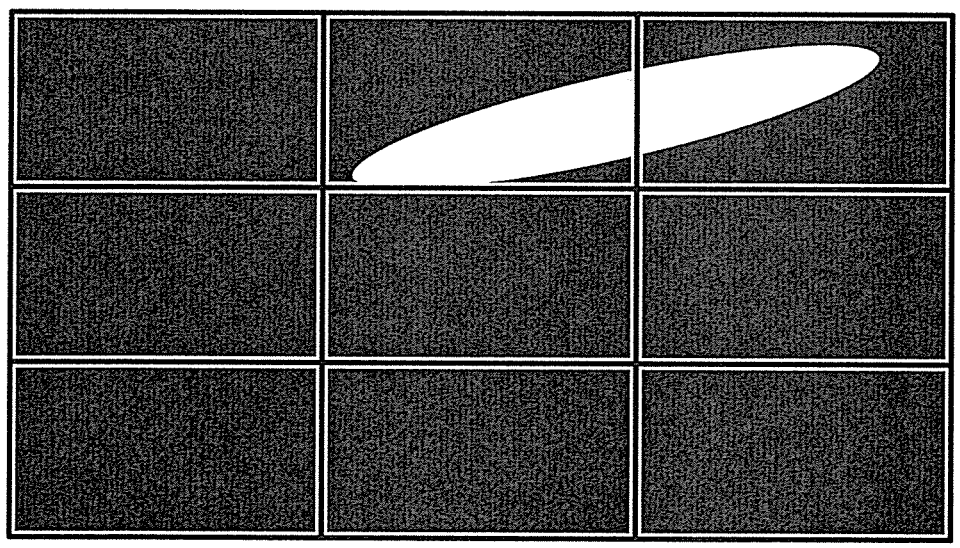
FIG. 11 is a drawing of exemplary shine detection according to the embodiment.

Exemplary shine detection according to the embodiment will now be described with reference to FIG. 11. FIG. 11 is a drawing of exemplary shine detection according to the embodiment.

As shown in FIG. 11, according to the embodiment, shine on area image data of each divided area may be detected by creating a histogram and calculating a shine detection slice on the area image data on a per-divided area basis.

Referring back to FIG. 9, the image quality determining unit 102d determines whether shine is equal to or smaller than a shine baseline and stores positional data of a divided area having shine determined to be equal to or smaller than the shine baseline, in the image data file 106a (Step SC10).

Figure 12:
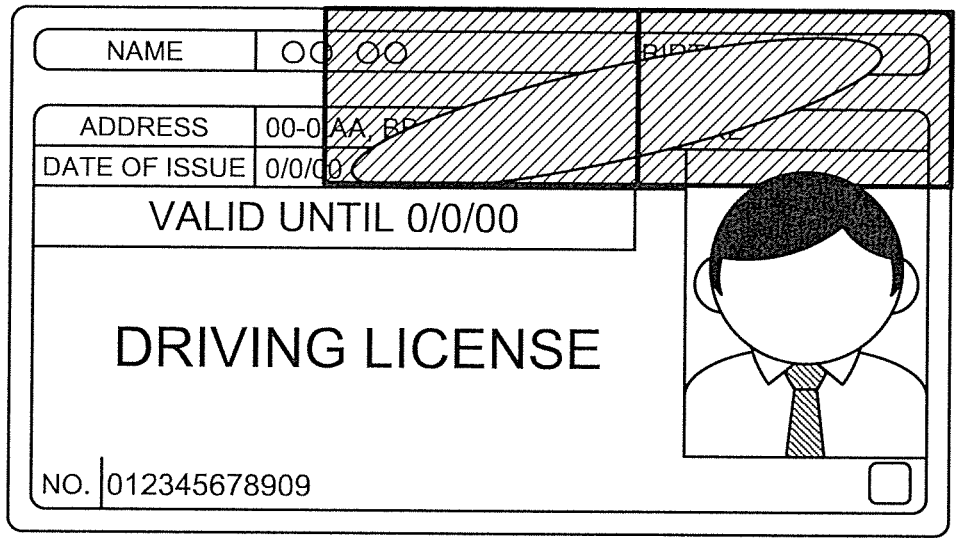
FIG. 12 is a drawing of exemplary shine determination according to the embodiment.

Exemplary shine determination according to the embodiment will now be described with reference to FIG. 12. FIG. 12 is a drawing of exemplary shine determination according to the embodiment.

As shown in FIG. 12, according to the embodiment, a middle area in the upper row and a right side area in the upper row of nine equally divided areas of a driving license may be determined to be shine areas.

Referring back to FIG. 9, the image quality determining unit 102d determines whether shine on the area image data has been determined on all the divided areas (Step SC11).

If the image quality determining unit 102d determines that shine on the area image data is not yet determined on all the divided areas (No at Step SC11), the processing is shifted to Step SC9.

If the image quality determining unit 102d determines that shine on the area image data has been determined on all the divided areas (Yes at Step SC11), the processing is shifted to Step SC12.

The image quality determining unit 102d further determines whether shine on the area image data is equal to or smaller than a shine baseline in all the divided areas (Step SC12).

If the image quality determining unit 102d determines that shine on the area image data is neither equal to nor smaller than a shine baseline in all the divided areas (No at Step SC12), the processing is shifted to Step SC13.

The notification display unit 102f displays notification data indicative of what the user needs to do on the input/output unit 112 based on the positional data of a divided area stored in the image data file 106a (Step SC13), and the processing is shifted to Step SC3.

Figure 13:
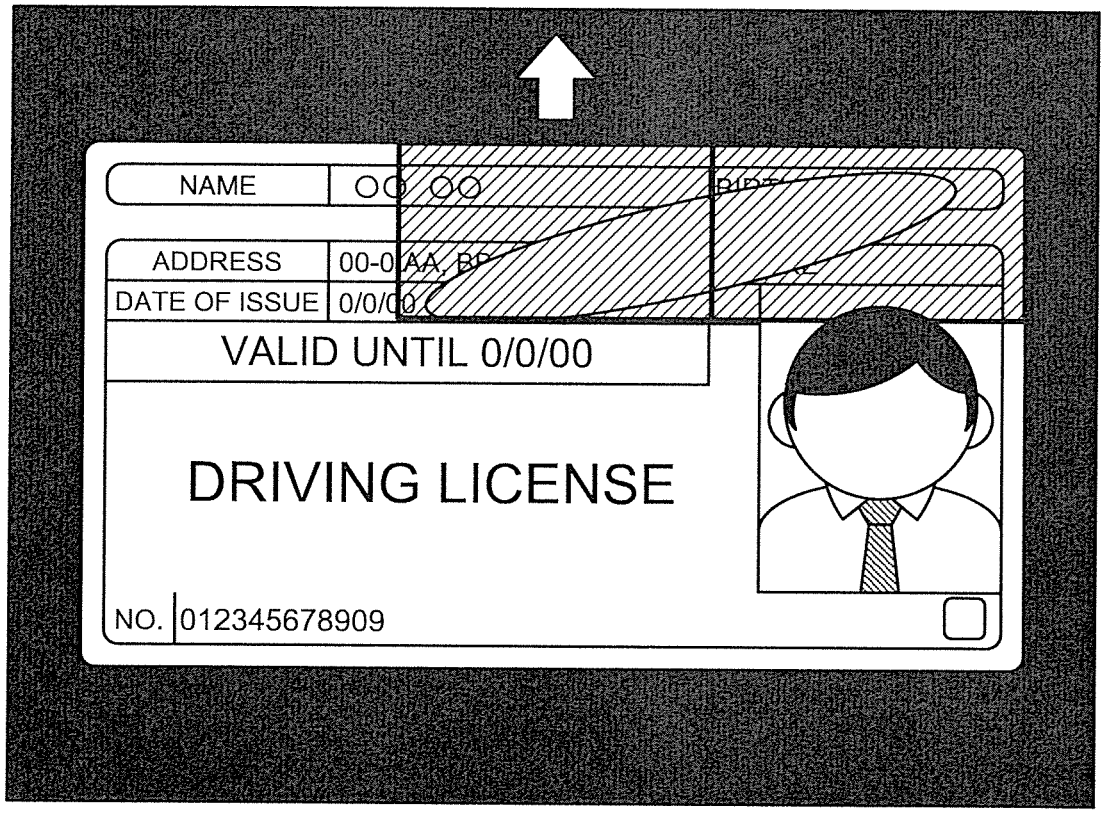
FIG. 13 is a drawing of exemplary user notification according to the embodiment.

Exemplary user notification according to the embodiment will now be described with reference to FIG. 13. FIG. 13 is a drawing of exemplary user notification according to the embodiment.

As shown in FIG. 13, according to the embodiment, when a middle divided area of the upper row and a right side divided area of the upper row of the driving license are determined to be shine areas as shown in FIG. 12, a method of user notification may have such notification data (the arrow data) displayed that indicates an instruction to have the user move the camera in the direction of the arrow.

Referring back to FIG. 9, when the image quality determining unit 102d determines that shine on the area image data is equal to or smaller than a shine baseline in all the divided areas (Yes at Step SC12), the processing is shifted to Step SC14.

The processing from SC14 to SC15 shown in FIG. 9 is the same as the processing from SA10 to SA11 shown in FIG. 2, and explanation thereof will be thus omitted.

According to the embodiment, such a manner that divides a document area and determines image quality on a per-divided area basis may be used to determine image quality of the document area. This manner eliminates necessity of determining image quality on all the areas, which achieves high-speed processing.

According to the embodiment, a divided area having shine equal to or smaller than a shine baseline is detected, and a countermeasure indicative of what the user needs to do is notified. This structure allows the user to take an immediate action.

According to the embodiment, upon detection of a position of a divided area the image quality of which does not satisfy a baseline, not an error notification indicating the presence of a divided area not satisfying the baseline but an instruction indicating what the user needs to do next is created based on the position.

Furthermore, as explained in the embodiment, image quality may be determined by calculating detection values (blur and shine) relating to image quality on the whole of the document area, on each divided area in the document area, or on a selected area in the document area.

Widespread use of mobile terminals such as a smartphone and a tablet changes manners of scanning from a conventional manner using a dedicated scanner to a manner using a mobile terminal with a camera.

This manner is advantageous because scanning using a camera is able to be performed anywhere as necessary and also because of its high flexibility that sets no limitation with respect to a used medium.

Photography by a camera has a problem in that the quality of a photographed image is less likely to be as high as the quality of a scanned image because of instability in the environmental factors including the amount of surrounding light, the direction of photography, motion during photography, and the like.

As a solution, good quality image is obtained by sensing using a mobile scanner application mounted on the mobile terminal 100 according to the embodiment.

As an approach from the hardware side, a conventional method for acquiring a good quality image by camera photography controls focusing operation using an auto-focus function and controls exposure from the amount of surrounding light.

As an approach from the software side, such a method is used that obtains the optimal photography timing by analyzing the feature amount (contrast and the like) of a preview image.

With these conventional methods, however, image quality of a photographed subject is less likely to be accurately determined because image quality is determined on the whole of the image including the background.

As a solution, a mobile scanner application mounted on the mobile terminal 100 according to the embodiment provides such a method that exclusively selects the area of the photographed subject as a target the image quality of which is determined before photography and acquires a still image at the optimal photography timing.

Other Embodiments

An embodiment of the disclosure has been described, however, the disclosure may be embodied by various different embodiments other than the embodiment within the scope of technical thoughts described in the appended claims.

For example, the mobile terminal 100 may execute processing as a stand-alone device. The mobile terminal 100 may execute processing upon request from a client terminal (a housing separate from the mobile terminal 100) and return results of the processing to the client terminal.

Furthermore, of the processing steps explained in the embodiment, the whole or a part of a processing step explained as automatic processing may be manually executed, and the whole or a part of a processing step explained as manual processing may be automatically executed by a known method.

Moreover, a processing procedure, a control procedure, a detailed name, information including registration data for processing and parameters such as a search condition, an exemplary screen, and a database structure, which are explained and shown in the description and the drawings, can be changed in any manner unless otherwise specified.

With regard to the mobile terminal 100, each component in the drawings is functionally and conceptually shown and does not necessarily physically configured as shown.

For example, of processing functions of the devices of the mobile terminal 100, particularly, of the processing functions executed by the control unit 102, the whole or a part of the processing function may be implemented by a CPU and a computer program interpreted and executed by the CPU or may be implemented as hardware using a wired logic.

The program is recorded in a later-described non-transitory computer-readable recording medium including a programmed command causing the computer to execute a method according the disclosure and is mechanically read by the mobile terminal 100 as necessary. The storage unit 106 such as a ROM and an HDD and others stores a computer program that commands the CPU and executes various kinds of processing in cooperation with an operating system (OS). The computer program is executed by being loaded to a RAM and configures a control unit in cooperation with the CPU.

The computer program may be stored in an application program server connected with the mobile terminal 100 via any network, and the whole or a part of the program can be downloaded as necessary.

A computer program according to the disclosure may be stored in a computer-readable recording medium or may be configured as a program product. The "recording medium" includes any "portable physical medium" such as a memory card, a USB memory, an SD card, a flexible disk, a magneto-optical disk, a ROM, an erasable programmable read only memory (EPROM), an electrically erasable programmable read only memory (EEPROM), a CD-ROM, a magneto-optical (MO) disk, a digital versatile disc (DVD), and a Blu-ray (registered trademark) disc.

The "program" is a data processing method described in any language or a descriptive method regardless of formats of source code, binary code, and the like. Furthermore, the "program" is not always singularly configured. Instead, the program may be dispersedly configured by a plurality of modules and a library or may implement the functions in cooperation with a separate program represented by an OS. A known configuration and procedure are applicable to a specific configuration for reading the recording medium, a reading procedure, an installation procedure after reading, and the like in the devices described in the embodiments.

Various kinds of databases and the like stored in the storage unit 106 are storage units including any one, some, or all of a memory device such as a RAM and a ROM, a stationary disk device such as a hard disk, a flexible disk, and an optical disc and may store any one, some, or all of various kinds of programs used for various kinds of processing and website service, a table, a database, a website file, and the like.

The mobile terminal 100 may be configured as an information processing device such as a known personal computer or may be configured with any peripheral connected to the information processing device. The mobile terminal 100 may be implemented by loading software (including a computer program, data, and the like) that implements the methods according to the disclosure onto the information processing device.

Detailed forms of separation and integration of devices are not limited to those shown in the drawings. The whole or a part of the device may be functionally or physically separated and integrated in any unit based on various additions or functional loads. The embodiments may be combined with one another in any manner, and one of the embodiments may be selectively implemented.

According to the disclosure, a photographer can obtain a still image having desired image quality through one photography process by preliminarily determining the image quality and having the image automatically photographed. This can reduce the work load on the photographer to retake a photograph of the image.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. A mobile terminal comprising:
   a memory; and
   a processor coupled to the memory, wherein
     the processor executes a process comprising:
     acquiring a frame with taking a photograph;
     from the frame, acquiring document image data of a document;
     detecting a shine on the document image data;
     determining whether the shine is equal to or smaller than a shine baseline; and
     acquiring a frame with retaking a photograph when the shine is neither equal to nor smaller than the shine baseline,
     wherein, detecting the shine includes:
       calculating a threshold of the shine based on a background gradation value as a gradation value with highest frequency of gradation values of pixels included in the document image data and based on a gradation value with high frequency of gradation values larger than the background gradation value, and
       detecting a total number of pixels having gradation values larger than the threshold among the pixels included in the document image data as the shine, wherein the threshold is an average value of the background gradation value and the gradation value that is larger than the background gradation value.

2. The mobile terminal according to claim 1, wherein
   the acquiring the document image data includes acquiring area image data of an area in the document from the frame, and
   the detecting includes detecting the shine on the area image data.

3. The mobile terminal according to claim 2, wherein the acquiring the document image data includes acquiring the area image data of the area in the document from the frame based on a document type of the document.

4. The mobile terminal according to claim 3, wherein the area is a content area in the document defined based on the document type.

5. The mobile terminal according to claim 1, wherein the process further comprises displaying notification data indicative of what a user needs to do when the shine is neither equal to nor smaller than the shine baseline.

6. The mobile terminal according to claim 1, wherein
   the acquiring the document image data includes acquiring area image data of divided areas in the document from the frame,
   the detecting includes detecting the shine on the area image data of each of the divided areas, and
   the determining includes determining whether the shine is equal to or smaller than the shine baseline in all the divided areas.

7. The mobile terminal according to claim 1, wherein
   the detecting further includes detecting blur on the document image data,
   the determining further includes determining whether the blur is equal to or larger than a blur baseline, and
   the acquiring the frame with retaking the photograph further includes acquiring the frame with retaking a photograph when the blur is neither equal to nor larger than the blur baseline.

8. The mobile terminal according to claim 4, wherein the acquiring the document image data includes acquiring the area image data of the content area in the document from the frame based on the document type of the document and a position from an end of the document.

9. The mobile terminal according to claim 4, wherein the content area is a character area.

10. The mobile terminal according to claim 1, wherein the process further comprises performing an optical character recognition processing on the document image data to acquire character data.

11. The mobile terminal according to claim 1, wherein the process further comprises displaying any one or both of the frame and the document image data.

12. The mobile terminal according to claim 1, wherein the frame is uncompressed image data.

13. An image processing method comprising:
    acquiring a frame with taking a photograph;
    from the frame, acquiring document image data of a document;
    detecting a shine on the document image data;
    determining whether the shine is equal to or smaller than a shine baseline; and
    acquiring a frame with retaking a photograph when the shine is neither equal to nor smaller than the shine baseline, wherein, detecting the shine includes:
      calculating a threshold of the shine based on a background gradation value as a gradation value with highest frequency of gradation values of pixels included in the document image data and based on a gradation value with high frequency of gradation values larger than the background gradation value, and detecting a total number of pixels having gradation values larger than the threshold among the pixels included in the document image data as the shine, wherein the threshold is an average value of the background gradation value and the gradation value that is larger than the background gradation value.

14. A non-transitory computer readable recording medium having stored therein a program, the program causing a computer to execute a process comprising:

acquiring a frame with taking a photograph;
from the frame, acquiring document image data of a document;
detecting a shine on the document image data;
determining whether the shine is equal to or smaller than a shine baseline; and
acquiring a frame with retaking a photograph when the shine is neither equal to nor smaller than the shine baseline, wherein, detecting the shine includes:
calculating a threshold of the shine based on a background gradation value as a gradation value with highest frequency of gradation values of pixels included in the document image data and based on a gradation value with high frequency of gradation values larger than the background gradation value, and
detecting a total number of pixels having gradation values larger than the threshold among the pixels included in the document image data as the shine, wherein the threshold is an average value of the background gradation value and the gradation value that is larger than the background gradation value.

* * * * *